United States Patent [19]

Dotzauer et al.

[11] Patent Number: 5,061,556

[45] Date of Patent: Oct. 29, 1991

[54] SHAPED ARTICLES

[75] Inventors: Bernhard Dotzauer, Maxdorf; Wilhelm F. Beckerle, Bobenheim-Roxheim; Hans-Juergen Denu, Deidensheim; Kurt Wendel; Manfred Schwartz, both of Ludwigshafen, all of Fed. Rep. of Germany

[73] Assignee: BASF Aktiengesellschaft, Ludwigshafen, Fed. Rep. of Germany

[21] Appl. No.: 482,986

[22] Filed: Feb. 22, 1990

[30] Foreign Application Priority Data

Mar. 4, 1989 [DE] Fed. Rep. of Germany ....... 3907013

[51] Int. Cl.$^5$ .................. B32B 27/00; C08K 7/12; C04B 25/04
[52] U.S. Cl. .................. 428/290; 428/454; 428/288; 523/200
[58] Field of Search .................. 428/290, 454, 288

[56] References Cited

U.S. PATENT DOCUMENTS 3,085,907  4/1963  Zdanowski et al. ............... 117/126
4,613,542  9/1986  Alexander ............................ 428/454

FOREIGN PATENT DOCUMENTS 123234   4/1984  European Pat. Off. .
0123234  10/1984  European Pat. Off. .
77766    3/1962  France .
2146766  2/1973  France .
1396128  6/1975  United Kingdom .

Primary Examiner—P. C. Sluby
Attorney, Agent, or Firm—Oblon, Spivak, McClelland, Maier & Neustadt

[57] ABSTRACT

A shaped article is obtainable by impregnating or coating a preform composed in the main of mineral fibers, nonfibrous mineral fillers and starch with a composition which contains a binder comprising a copolymer composed of a) 60-95% by weight of methyl methacrylate (monomer I),
b) 5-40% by weight of acrylic or methacrylic acid (monomer II)
c) 0-35% by weight of one or more acrylic esters of a $C_1$-$C_8$-alkanol (monomer III),
d) 0-5% by weight of a copolymerizable olefinically polyunsaturated monomer (monomer IV), and
e) 0-5% by weight of another copolymerizable monomer (monomer V)

in polymerized form, the weight percentages of monomers I, II, III and V having been selected within the stated limits in such a way that a polymer composed of these monomers only would have a glass transition temperature of from 60° to 125° C.

1 Claim, No Drawings

SHAPED ARTICLES

The present invention relates to shaped articles obtainable by impregnating and/or coating preforms composed in the main of mineral fibers, nonfibrous mineral fillers and starch with compositions which contain binders comprising copolymers composed of
- a) 60-95% by weight of methyl methacrylate (monomer I),
- b) 5-40% by weight of acrylic and/or methacrylic acid (monomers II)
- c) 0-35% by weight of one or more acrylic esters of a $C_1$-$C_8$-alkanol (monomers III),
- d) 0-5% by weight of copolymerizable olefinically polyunsaturated monomers (monomers IV), and
- e) 0-5% by weight of other copolymerizable monomers (monomers V)

in polymerized form, the weight percentages of monomers I, II, III and V being selected within the stated limits in such a way that a polymer composed of these monomers only would have a glass transition temperature of from 60° to 125° C.

Preforms which are composed in the main of mineral fibers, nonfibrous mineral fillers and starch and processes for preparing same are common knowledge. Customarily, they are provided for a wide variety of purposes with a decorative coating which contains binders comprising in the main vinyl acetate polymers or copolymers based on vinyl acetate, vinyl chloride and ethylene or acrylic esters and styrene. Such shaped articles are used inter alia in sheet form as sound insulation panels.

However, shaped articles of the structure mentioned have the disadvantage of lack of dimensional stability in high atmospheric humidity. They absorb humidity from the air and deform under their own weight.

EP-A-0 123 234 contains a reference to sound insulation panels formed in the main from mineral fibers, nonfibrous mineral fillers and starch which, to increase their dimensional stability in high atmospheric humidity, have been coated with aqueous melamine/formaldehyde resins. However, it is a defect of such coatings that with time they will frequently give off formaldehyde, which is a disadvantage in particular for use in closed spaces.

It is an object of the present invention to convert preforms composed in the main of mineral fibers, nonfibrous mineral fillers and starch into, formaldehydefree shaped articles which possess improved dimensional stability in high atmospheric humidity and in sheet form are suitable in particular for use as sound insulation panels.

We have found that this object is achieved by the shaped articles as defined at the beginning.

We have also found that particularly highly suitable coating compositions for preparing the coatings according to the present invention contain
- a) 3-10% by weight of the copolymers mentioned in the form of a dispersion polymer (calculated on a waterfree basis),
- b) 60-75% by weight of finely divided inert fillers,
- c) small amounts of other customary assistants and
- d) a remainder of not less than 15% by weight of water.

Monomer II is preferably methacrylic acid, while preferred monomers III are methyl acrylate, ethyl acrylate, n-butyl acrylate and 2-ethylhexyl acrylate. Suitable monomers IV are in particular olefinically doubly unsaturated monomers such as divinylbenzene, butanediol acrylate, butanediol dimethacrylate and diallyl phthalate, while preferred monomers V are acrylonitrile, methacrylonitrile, vinyl esters of alkanoic acids of 2 to 6 carbon atoms, such as vinyl acetate and vinyl propionate, and also aromatic vinyl compounds such as styrene and vinyltoluene.

If the copolymers to be used according to the present invention contain mixtures of monomers I, II, III and/or V, the weight percentages of these monomers are advantageously chosen with the aid of the Fox equation in such a way that a polymer composed of these monomers only would have a glass transition temperature Tg of from 60° to 125° C. According to Fox (T. G. Fox, Bull. Am. Phys. Soc. (Ser. II) 1 (1956), 123), the glass transition temperature of copolymers is given to a good approximation by:

$$\frac{1}{Tg} = \frac{X^1}{Tg^1} + \frac{X^2}{Tg^2} + \ldots \frac{X^n}{Tg^n}$$

where $X^1, X^2, \ldots, X^n$ are the mass fractions of monomers $1, 2, \ldots, n$ and $Tg^1, Tg^2, \ldots, Tg^n$ are the glass transition temperatures in degrees kelvin of each of the polymers composed of only one of the monomers $1, 2, \ldots$ or $n$. The glass transition temperatures of these homopolymers of the abovementioned monomers I, II, III and V are known and given for example in J. Brandrup, E. H. Immergut, Polymer Handbook 1st Ed. J. Wiley, N.Y., 1966 and 2nd Ed. J. Wiley, N.Y., 1975. Particular preference is given to copolymers of the following composition:
- a) 60-75% by weight of methyl methacrylate,
- b) 5-30% by weight of methacrylic acid and 0-10% by weight of acrylic acid, and
- c) 0-30% by weight of monomers III.

Copolymers of the composition defined at the beginning are known and obtainable by the known methods of free radical solution and emulsion polymerization, so that no further details are required in this context. Since the coating and/or impregnating compositions according to the present invention are preferably used in the form of aqueous dispersions, it is particularly advisable that the binder should likewise be used in that form, and it is accordingly preferably prepared as an emulsion polymer. The number average molecular weight is customarily from $5 \times 10^3$ to $5 \times 10^6$, preferably from $10^5$ to $2 \times 10^6$. Suitable emulsifiers are in particular anionic emulsifiers such as the alkali metal salts of $C_{12}$-$C_{14}$-alkanesulfonic acids. The pH of the aqueous dispersions initially obtainable by free radical emulsion polymerization is advantageously adjusted by the addition of 25% by weight aqueous ammonia to pH 3-7, preferably pH 4-6. If the pH is increased further, the aqueous dispersions generally turn into clear liquids (solutions) which are particularly advantageous for impregnation and preferably have a pH of from 7 to 8.5.

Besides the obligatory copolymer the compositions to be applied according to the present invention may additionally contain customary coating or impregnating assistants. Examples thereof are finely divided inert fillers such as aluminum silicates, quartz, precipitated or pyrogenic silica, gypsum, barite, talcum, dolomite or calcium carbonate, pigments such as titanium white, lead white, zinc white, iron oxide black, zinc green, cadmium red or cadmium yellow, viscosity regulators such as the reaction products of ethoxylated (degree of ethoxylation: 70-110) $C_{14}$-$C_{16}$-alkanols with hexamethylene diisocyanate, dispersants such as the ammonium salts of medium molecular weight polyacrylic acids having a weight average molecular weight $\overline{M}_w$ of from 40,000 to 60,000, foam inhibitors such as dimethylpolysiloxanes, adhesion promoters, water-soluble dyes or preservatives. The amounts of these additives to be used are known per se to the person skilled in the art and are in each case decided according to the properties desired of a particular composition. Based on the total weight of the preparation, the proportion of the copolymers defined at the beginning is in general from 1 to 30% by weight, while the proportion of inert fillers is 0-85% by weight and the water content is not less than 10% by weight. The compositions to be used according to the present invention are advantageously prepared by stirring the optional additives which it has been decided to use into a 5-65% strength by weight aqueous dispersion or solution of the copolymer defined at the beginning. Additive-free dispersions or solutions are preferably used for impregnating. Advantageously, the preforms are initially impregnated with aqueous copolymer solutions according to the present invention, preferably all over, and then, after drying, coated with pigmented compositions according to the present invention as decoration.

To obtain visually appealing coatings, it is of advantage to carry out the entire coating operation in multiple stages between which the most recently applied layer is dried, in general at 100°-180° C. The process according to the present invention can be used with particular advantage for producing sound insulation panels of improved dimensional stability in the presence of atmospheric humidity from sheetlike preforms which may have been provided with sound-absorbing structures. The compositions according to the present invention can be applied by spraying, rolling or casting, in general after the surface of the preform has been sanded down. The amounts applied (calculated in amounts M of the anhydrous copolymer present in the coating or impregnating composition) range in general from 2 to 100 $g/m^2$.

EXAMPLES E1 TO E16 AND

Comparative Examples C1 to C4.

Dimensional stability of some sheetlike articles under high atmospheric humidity

EXAMPLE 1

A 1.5 cm thick sheetlike (60 cm × 60 cm, sanded front with sound-absorbing structure, unsanded back) preform having a composition of 66% by weight of basalt wool, 26% by weight of finely divided clay and 7% by weight of starch and a density of 0.35 $g/cm^3$ was coated on the front in two stages by spraying with a composition obtained by stirring
800 g of finely divided $CaCO_3$,
4 g of a viscosity regulator based on the reaction product of a mixture of ethoxylated (degree of ethoxylation: 100) $C_{14}$-$C_{16}$-alkanols with hexamethylene diisocyanate,
4 g of the ammonium salt of a medium molecular weight polyacrylic acid ($\overline{M}_w$=50,000), and
2 g of a foam-inhibiting preparation based on a dimethylpolysilane
into 304 g of a 12% strength by weight aqueous anionic dispersion (pH=6.2) of an emulsion copolymer of 70% by weight of methyl methacrylate, 25% by weight of methacrylic acid and 5% by weight of acrylic acid, after each stage the applied layer being dried at 160° C. for 20 minutes. The amounts applied in the two stages were, in amounts M of the anhydrous copolymer present in the coating composition, 11.7 and 10.0 $g/m^2$ respectively. Thereafter the sound insulation panel obtained was stored in a horizontal position for 48 h at 38° C. and 95% relative humidity on a metal frame in such a way that the contact area had a width of 1 cm on all sides. The dimensional change was then measured by determining the distance a of the panel midpoint (intersection of the diagonals) from its starting position a was found to be 34 mm.

EXAMPLE 2

The same as Example 1, except for the following differences: the back was coated in an additional stage.
M front: 13.4 and 6.7 $g/m^2$
M back: 8.3 $g/m^2$
a: 28 mm

EXAMPLE 3

The same as Example 1, except for the following differences: the additives were stirred into 280 g of a 12.9% strength by weight aqueous anionic dispersion (pH=7.3) of an emulsion copolymer of 65% by weight of methyl methacrylate, 28% by weight of n-butyl acrylate and 7% by weight of methacrylic acid.
M front: 12.6 and 11.6 $g/m^2$
a: 31 mm

EXAMPLE 4

The same as Example 3, except for the following differences: the back was coated in an additional stage.
M front: 10.6 and 9.6 $g/m^2$
M back: 5.9 $g/m^2$
a: 26 mm

EXAMPLE 5

The same as Example 1, except for the following differences: the additives were stirred into 310 g of a 14.5% strength by weight aqueous anionic dispersion (pH=7.8) of an emulsion copolymer of 75% by weight of methyl methacrylate, 20% by weight of 2-ethylhexyl acrylate, 4% by weight of methacrylic acid and 1% by weight of acrylic acid.
M front: 12.4 and 11.2 $g/m^2$
a: 35 mm

EXAMPLE 6

The same as Example 5, except for the following differences: the back was coated in an additional stage.
M front: 12.0 and 11.6 $g/m^2$
M back: 10.5 $g/m^2$
a: 23 mm

EXAMPLE 7

The same as Example 1, except for the following differences: the additives were stirred into 294 g of a 13.4% strength by weight aqueous anionic dispersion (pH=6.8) of an emulsion copolymer of 60% by weight of methyl methacrylate, 20% by weight of n-butyl acrylate, 10% by weight of methyl acrylate and 10% by weight of methacrylic acid.
M front: 10.7 and 11.4 $g/m^2$
a: 34 mm

EXAMPLE 8

The same as Example 7, except for the following differences: the back was coated in an additional stage.
M front: 12.5 and 12.5 g/m$^2$
M back: 7.1 g/m$^2$
a: 27 mm

EXAMPLE 9

The same as Example 1, except for the following differences: the additives were stirred into 440 g of a 6.8% strength by weight aqueous solution (pH=8.2) of an emulsion copolymer of 65% by weight of methyl methacrylate, 5% by weight of 2 ethylhexyl acrylate and 30% by weight of methacrylic acid.
M front: 9.6 and 4.8 g/m$^2$
a: 22 mm

EXAMPLE 10

The same as Example 9, except for the following differences: the back was coated in an additional stage.
M front: 7.2 and 7.2 g/m$^2$
M back: 7.2 g/m$^2$
a: 18 mm

EXAMPLE 11

The same as Example 1, except for the following differences: the additives were stirred into 420 g of a 9% strength by weight aqueous solution (pH=7.8) of an emulsion copolymer of 60% by weight of methyl methacrylate, 10% by weight of methyl acrylate and 30% by weight of methacrylic acid.
M front: 12.3 and 6.1 g/m$^2$
a: 28 mm

EXAMPLE 12

The same as Example 11, except for the following differences: the back was coated in an additional stage.
M front: 11.7 and 6.1 g/m$^2$
M back: 7.7 g/m$^2$
a: 23 mm

EXAMPLE 13

The same as Example 1, except for the following differences: the additives were stirred into a mixture of 281.6 g of 13% strength by weight aqueous anionic dispersion (pH=7.3) of an emulsion copolymer of 65% by weight methyl methacrylate, 28% by weight of n-butyl acrylate and 7% by weight of methacrylic acid and 20.4 g of a 9% strength by weight aqueous solution (pH=7.2) of an emulsion copolymer of 60% by weight of methyl methacrylate, 10% by weight of methyl acrylate and 30% by weight of methacrylic acid.
M front: 5.2 and 5.0 g/m$^2$
a: 25 mm

EXAMPLE 14

The same as Example 13, except for the following differences: the back was coated in an additional stage.
M front: 6.1 and 5.4 g/m$^2$
M back: 3.1 g/m$^2$
a: 21 mm

EXAMPLE 15

The sheetlike preform of Example 1 was impregnated on the front and back by spraying with the 9% strength by weight aqueous polymer solution of Example 11 and dried as in Example 1.
M front: 57 g/m$^2$
a: 78 g/m$^2$ After drying, the front was additionally coated with the composition of Example 3.
M front: an additional 17.5 g/m$^2$
a was determined in the same way as in Example 1.
a: 20 mm

EXAMPLE 16

The same as Example 15, except for the following differences: a 12.5% strength by weight aqueous polymer solution of the emulsion copolymer of Example 9 and the composition of Example 5 were used.
M front: 74 g/m$^2$
M back: 71 g/m$^2$
M front: an additional 18.6 g/m$^2$
a: 17 mm

CE 1

The same as Example 1, except for the following differences: the additives were stirred into 296 g of 16% strength by weight aqueous anionic dispersion (pH=7.8) of an emulsion copolymer of 49% by weight of n-butyl acrylate, 49% by weight of styrene and 2% by weight of acrylic acid. The sound insulation panel was stored at 38° C. and 95% relative humidity for only 24 h.
M front: 17.1 and 10.7 g/m$^2$
a: >50 mm

CE 2

The same as CE 1, except for the following differences: the back was coated in an additional stage.
M front: 15.0 and 10.7 g/m$^2$
M back: 8.6 g/m$^2$
a: >50 mm

CE 3

The same as Example 1, except for the following differences: the additives were stirred into 304 g of a 17.2% strength by weight aqueous anionic dispersion (pH=7.2) of an emulsion copolymer of 57% by weight of vinyl acetate, 27% by weight of vinyl chloride and 16% by weight of ethylene. The sound insulation panel was stored at 38° C. and 95% relative humidity for only 24 h.
M front: 19.7 and 13.6 g/m$^2$
a: >50 mm

CE 4

The same as CE 3, except for the following differences: the back was coated in an additional stage.
M front: 16.1 and 9 4 g/m$^2$
M back: 10.8 g/m$^2$
a: >50 mm

We claim:
1. A shaped article obtained by impregnating or coating a preform comprised of mineral fibers, non-fibrous mineral fillers and starch with a composition containing a binder comprised of a copolymer of
   a) 60-95% by weight of methyl methacrylate,
   b) 5-40% by weight of acrylic or methacrylic acid,
   c) 0-35% by weight of one or more acrylic esters of a $C_1$-$C_8$-alkanol,
   d) 0-5% by weight of a copolymerizable olefinically polyunsaturated monomer, and
   e) 0-5% by weight of another copolymerizable monomer selected from the group consisting of acrylonitrile, methacrylonitrile, vinyl esters of alkanoic acids of 2 to 6 carbon atoms and aromatic vinyl compounds, with the proviso that

$$\frac{1}{\frac{X^1}{Tg^1}+\frac{X^2}{Tg^2}+\frac{X^3}{Tg^3}+\frac{X^4}{Tg^4}} = 333°\ K - 398°\ K,$$

$Tg^1 =$ the glass transition temperature in °K of a polymer solely composed of said methyl methacrylate, $Tg^2 =$ the glass transition temperature in °K of a polymer solely composed of said acrylic or methacrylic acid, $Tg^3 =$ the glass transition temperature in °K of a polymer solely composed of said one or more acrylic esters of $C_1$–$C_8$-alkanol, $Tg^4 =$ the glass transition temperature in °K of a polymer solely composed of said another copolymerizable monomer, $x^1 = w^1/(w^1+w^2+w^3+w^4)$,
$x^2 = w^2/(w^1+w^2+w^3+w^4)$,
$x^3 = w^3/(w^1+w^2+w^3+w^4)$,
$x^4 = w^4/(w^1+w^2+w^3+w^4)$, $w^1 =$ the weight of said methyl methacrylate in said copolymer, $w^2 =$ the weight of said acrylic or methacrylic acid in said copolymer, $w^3 =$ the weight of said one or more acrylic esters of a $C_1$–$C_8$-alkanol in said copolymer, and $w^4 =$ the weight of said another copolymerizable monomer in said copolymer.

* * * * *